US006578176B1

(12) United States Patent
Wang et al.

(10) Patent No.: US 6,578,176 B1
(45) Date of Patent: Jun. 10, 2003

(54) METHOD AND SYSTEM FOR GENETIC ALGORITHM BASED POWER OPTIMIZATION FOR INTEGRATED CIRCUIT DESIGNS

(75) Inventors: Chuan-Yu Wang, Sunnyvale, CA (US); Ping-Hann Peter Wang, Mountain View, CA (US); Yi-Min Jiang, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 09/570,244

(22) Filed: May 12, 2000

(51) Int. Cl.$^7$ .............................. G06F 17/50; G06N 3/12
(52) U.S. Cl. ................... 716/2; 716/6; 706/13
(58) Field of Search .............................. 716/1, 2, 4, 5, 716/18, 6; 706/13; 703/2, 11, 13, 14, 18, 19

(56) References Cited

U.S. PATENT DOCUMENTS 5,867,397 A * 2/1999 Koza et al. ................. 364/489
6,327,552 B2 * 12/2001 Nemani et al. ................. 703/2
6,360,191 B1 * 3/2002 Koza et al. ..................... 703/6

OTHER PUBLICATIONS

Martin et al., "PASSOS: A Different Approach for Assignment and Scheduling for Power, Area and Speed Optimization in High–Level Synthesis," 1995 Proc. 37$^{th}$ Midwest Symposium on Circuits and Systems, pp. 339–342.*
Arslan et al., "Genetic Synthesis Techniques for Low–Power DSP Circuits," IEE Colloquium on Digital System Design using Synthesis, 1996, pp. 7/1–7/5.*
Bright et al., "Genetic framework for the high level optimisation of low power VLSI DSP systems," Electronic Letters, vol. 32, No. 13, 1996, pp. 1150–1151.*
Bright et al., "A Genetic Algorithm for the High–Level Synthesis of DSP Systems for Low Power," Genetic Algorithms in Engineering Systems: Innovations and Applications, IEE Conference Publication No. 446, 1997, pp. 174–179.*

(List continued on next page.)

Primary Examiner—Leigh M. Garbowski
(74) Attorney, Agent, or Firm—Wagner, Murabito, Hao LLP

(57) ABSTRACT

A genetic algorithm (GA) based approach to optimize integrated circuit designs for power dissipation. The genetic algorithm optimization process efficiently generates tight lower bounds of the peak power dissipation for a given integrated circuit design. In this approach, the power within a given integrated circuit design circuit is viewed as a function in terms of a set of stimuli to primary inputs of the integrated circuit design. Maximization of the function, and hence, the power dissipation is guided by the genetic algorithm. By repeatedly stimulating the integrated circuit design and measuring the corresponding response, the genetic algorithm process efficiently explores the solution space to obtain a maximization of the function. The genetic algorithm process is implemented within a computer-based EDA (electronic design automation) synthesis system. The EDA synthesis system executes the computer implemented steps of accessing a circuit netlist representing an integrated circuit design to be realized in physical form, defining a function that describes the power with respect to stimulation, maximizing the function by using a genetic algorithm to obtain a set of stimulation inputs which generate a maximum power dissipation, and optimizing power dissipation for the circuit netlist by optimizing those portions of the circuit netlist identified by the set of stimulation inputs.

12 Claims, 10 Drawing Sheets

OTHER PUBLICATIONS

Bright et al., "Transformational–Based Synthesis of VLSI Based DSP Systems for Low Power Using a Genetic Algorithm," ISCAS 1998, pp. 45–48.*

Chiusano et al., "Exploiting Symbolic Techniques within Genetic Algorithms for Power Optimization," Proc. $9^{th}$ IEEE Int'l Conference on Tools with AI, 1997, pp. 133–140.*

Hsiao et al., "K2: An Estimator for Peak Sustainable Power of VLSI Circuits," Proc. Int'l Symposium on Low Power Electronics and Design, 1997, pp. 178–183.*

Jiang et al., "Estimation of Maximum Power and Instantaneous Current Using a Genetic Algorithm," IEEE 1997 Custom ICs Conference, pp. 135–138.*

Placer et al., "A Framework for Estimating Maximum Power Dissipation in CMOS Combinational Circuits USing Genetic Algorithms," Proc. $28^{th}$ Southeastern Symposium on System Theory, pp. 348–352.*

* cited by examiner

TABLE I
PERFORMANCE OF GAP (PEAK AVG. POWER) ON ISCAS-85 COMBINATIONAL BENCHMARKS

| Benchmark Ckt | GAP | | Random Simulation | | | Power Ratio |
|---|---|---|---|---|---|---|
| | p_size = 20 | p_size = 30 | match GAP_20 | match GAP_30 | (10,000 pairs) | GAP_20/ (match GAP_20) |
| C1355 (7609 elems) | 1.03564e-2 9024 secs | 1.06907e-2 17782 secs | 6.23128e-3 (3720 pairs) | 6.23128e-3 (5670 pairs) | 6.78307e-3 watts 32212 secs | 1.66 |
| C1908 (8178 elems) | 9.00421e-3 9797 secs | 9.40766e-3 18361 secs | 7.10617e-3 (3460 pairs) | 7.10617e-3 (5250 pairs) | 7.14962e-3 watts 31173 secs | 1.26 |
| C2670 (11444 elems) | 1.12175e-2 17281 secs | 1.27407e-2 29037 secs | 9.2283e-3 watts (4760 pairs) | 9.2283e-3 watts (7320 pairs) | 9.2283e-3 watts 35389 secs | 1.21 |
| C3540 (15965 elems) | 1.97327e-2 15619 secs | 1.97334e-2 34926 secs | 1.34319e-2 (3540 pairs) | 1.49438e-2 (5670 pairs) | 1.49438e-2 watts 68328 secs | 1.47 |
| C5315 (26092 elems) | 2.92423e-2 31150 secs | 3.02215e-2 67034 secs | 2.05864e-2 (4500 pairs) | 2.05864e-2 (6540 pairs) | 2.05864e-2 watts 84772 secs | 1.42 |
| C7552 (36426 elems) | 4.99457e-2 52819 secs | 4.96201e-2 149815 secs | 3.69252e-2 (5040 pairs) | 3.79002e-2 (7350 pairs) | 3.79478e-2 watts 108156 secs | 1.35 |

FIGURE 8

TABLE II
PERFORMANCE OF GAP (PEAK AVG. POWER) ON ISCAS-89 SEQUENTIAL BENCHMARKS

| Benchmark Ckt | Item | GAP | | Random Simulation | | Power Ratio | |
|---|---|---|---|---|---|---|---|
| | | seq. | comb. | Match seq | 10000 tiplets | seq/comb | seq/(same # of random) |
| s 1494 (10178 elems) | watts | 6.89435E-3 | 6.33879E-3 | 6.57724E-3 | 6.87724E-3 | 1.088 | 1.002 |
| | sec | 5295 | 3426 | 5052 | 16092 | | |
| | gen_num | 157 | 157 | 157 | 500 | | |
| s 5378 (22794 elems) | watts | 1.01308E-2 | 6.96858E-3 | 8.19757E-3 | 8.19757E-3 | 1.454 | 1.236 |
| | sec | 21452 | 7601 | 24796 | 72083 | | |
| | gen_num | 172 | 155 | 172 | 500 | | |
| s 9234 (21634 elems) | watts | 1.09315E-2 | 6.23987E-3 | 7.70176E-3 | 8.14348E-3 | 1.752 | 1.419 |
| | sec | 15761 | 4314 | 24978 | 73036 | | |
| | gen_num | 171 | 151 | 171 | 500 | | |
| s 15850 (72212 elems) | watts | 2.70587E-2 | 1.13678E-2 | 2.462245E-1 | 2.46245E-2 | 2.380 | 1.099 |
| | sec | 73757 | 15274 | 60472 | 188978 | | |
| | gen_num | 160 | 156 | 160 | 500 | | |
| s 35932 (241986 elems) | watts | 2.51115E-1 | 2.45473E-1 | 2.36437E-1 | 2.38517E-1 | 1.023 | 1.062 |
| | sec | 369242 | 131668 | 331574 | 998719 | | |
| | gen_num | 166 | 155 | 166 | 500 | | |
| s 38417 (186724 elems) | watts | 1.5075E-1 | 9.69922E-1 | 1.43303E-1 | 1.43303E-1 | 1.554 | 1.052 |
| | sec | 198649 | 50474 | 178213 | 556918 | | |
| | gen_num | 160 | 150 | 160 | 500 | | |
| s 38584 (233148 elems) | watts | 1.56371E-1 | 1.45789E-1 | 1.46754E-1 | 1.51329E-1 | 1.073 | 1.051 |
| | sec | 221635 | 100221 | 208587 | 660087 | | |
| | gen_num | 158 | 158 | 158 | 500 | | |

FIGURE 9

METHOD AND SYSTEM FOR GENETIC ALGORITHM BASED POWER OPTIMIZATION FOR INTEGRATED CIRCUIT DESIGNS

FIELD OF THE INVENTION

The field of the present invention pertains to the field of integrated circuit design optimization using electronic design automation tools. More particularly, aspects of the present invention pertain to a power dissipation optimization process for use in the design of complex integrated circuits with electronic design automation (EDA) tools.

BACKGROUND OF THE INVENTION

Computer systems, software applications, and the devices and processes built around them are continually growing in power and complexity. Society's reliance on such systems is likewise increasing, making it critical that the systems deliver the expected performance and obey the properties that their designers intended. As each successive generation of computer and software implemented systems and processes become more powerful, the task of designing and fabricating them becomes increasingly difficult.

Increasing levels of integration allow much higher circuit densities per integrated circuit die. Higher circuit densities allow higher operating speeds. During the operation cycle of a high-density integrated circuit, a certain amount of power will be drawn by the integrated circuit. This amount of power depends upon the types of operations the circuit is performing. For example, operations requiring large amounts of switching produce correspondingly large amounts of power dissipation.

Hence, the power dissipation experienced by the integrated circuit varies over time as the integrated circuit functions. During certain operations, the integrated circuit will experience peak power dissipation, where the amount of power dissipated by the circuit per unit of time is at maximum. Peak power affects the amount of heat generated by the integrated circuit. Peak power typically equates to peak heat generation, and thus, peak power characteristics are among the most important design constraints for new integrated circuit devices.

The design and manufacture of increasingly complex integrated circuits involves extensive use of CAD tools. The development of ASICs (application specific integrated circuits) and other complex integrated circuits using CAD tools is referred to as electronic design automation, or EDA. The design, checking, and testing of large-scale integrated circuits are so complex that the extensive use of CAD and EDA tools are required for realization of modern, complex integrated circuits.

The development of a new integrated circuit device begins with a design phase involving extensive use of EDA tools to facilitate various aspects of designing the new integrated circuit device. Typically, EDA tools function in part by decomposing the overall desired behavior of the integrated circuit into simpler functions which are more easily manipulated and processed. The EDA tool performs considerable computation to generate an efficient layout of a resulting "network" of design elements (e.g., logic gates, storage elements, etc.). The resulting network, commonly referred to as a netlist, comprises a detailed specification defining the integrated circuit, typically in terms of a particular fabrication technology (e.g., CMOS). The netlist can be regarded as a template for the fabrication of the physical embodiment of the integrated circuit using transistors, routing resources, etc.

Netlists for integrated circuit designs can represent a particular integrated circuit in different levels of abstraction, such as the register transfer level (RTL) and the logical level, using a hardware description language (HDL), also called high level design language. The HDL description is used along with a set of circuit constraints as an input to a computer-implemented compiler (also called a "silicon compiler" or "design compiler"). The compiler program processes the HDL description of the integrated circuit and generates therefrom a low-level netlist comprised of detailed lists of logic components and the interconnections between these components. The components specified by the netlist can include primitive cells such as full-adders, NAND gates, NOR gates, XOR gates, latches, and D-flip flops, etc., and their interconnections. In recent years the design process has become increasingly powerful and sophisticated, yielding very large, very complex high density integrated circuit devices.

Increasing levels of integration allow much higher circuit densities per integrated circuit die. Higher circuit densities allow higher operating speeds. During the operation cycle of a high-density integrated circuit, a certain amount of power will be drawn by the integrated circuit. This amount of power depends upon the types of operations the circuit is performing. For example, operations requiring large amounts of switching produce correspondingly large amounts of power dissipation.

Hence, the power dissipation experienced by the integrated circuit varies over time as the integrated circuit functions. During certain operations, the integrated circuit will experience peak power dissipation, where the amount of power dissipated by the circuit per unit of time is at maximum. Peak power affects the amount of heat generated by the integrated circuit. Hence, peak power typically equates to peak heat generation.

Heat generation is not uniformly spread across the area of the integrated circuit. Peak heat generation corresponds to peak power requirements, which in turn corresponds to circuit switching activity. For example, during certain operations some portions of the integrated circuit may be relatively inactive (e.g., memory elements) while other portions are highly active (e.g., arithmetic logic units). The non-uniform heat generation leads to the development of "hot spots" within the area of the integrated circuit die. The hot spots are the first areas of the integrated circuit to be adversely affected by higher levels of heat generation.

Thus, the existence and the characteristics of such hot spots are one of the primary limiting factors on the maximum potential operating speed of the integrated circuit. Accordingly, "peak power" is an important parameter that affects the life of circuit. Excessive localized heat generation leads to thermal breakdown of the actual integrated circuit elements themselves (e.g., electron migration, etc.).

In accordance with the prior art, circuit developers use EDA tools (e.g., netlist simulations, etc.) during the design phase in an attempt to predict the peak power dissipation of the device, and thereby design higher performance integrated circuit devices. For example, a netlist description of the device is loaded onto an EDA simulation tool for optimization in accordance with, for example, a set of power dissipation constraints. The simulation tool stimulates the netlist using a large series of test inputs in an attempt to stimulate its operation and predict therefrom the power requirements and characteristics of the device. The results of the simulation allow the device to be optimized with respect to peak power and peak heat generation. Increasing levels of integration unfortunately leads to increasing complexity of the simulation and a corresponding increase in the difficulty of the optimization process.

As described above, peak power in high-density integrated circuits has a great impact on power budgeting, packaging, as well as circuit's reliability. However, performance and reliability requirements continue to drive the design process towards ever greater levels of integration and ever greater operating speeds. To synthesize highly reliable systems, accurate estimates of maximum power must be obtained in various design phases. Unfortunately, determining the input patterns (e.g., inputs to the netlist of integrated circuit) to induce the maximum current (power) is essentially a combinatorial optimization problem. Even for circuits with small number of primary inputs, it is computer time intensive to conduct exhaustive search of the input vector space.

Because of this large input vector space, the compiling and optimization of large integrated circuit designs typically require one, or more, of the most powerful CAD workstations. Large amounts of memory are required to store the details regarding the various aspects of the netlist and large amounts of CPU time are required to perform the various compilation and optimization routines on the netlist. For example, successive passes through the design phase (e.g., in an attempt to rectify abnormally intense hot spots) is often required in order to optimize a design completely with respect to peak power constraints, and can be very impractical. Thus, circuit designers often resort to merely finding good upper and lower bounds of the peak power, and to make the gap between these two bounds as narrow as possible, within a reasonable amount of time. Because of this, large designs are typically not optimized is vigorously as smaller designs.

This lack of thoroughness in power optimization leads to a number of serious consequences. For example, non-optimal power dissipation leads to fabricated integrated circuit devices which are less than optimally efficient (e.g., shorter circuit life, larger than necessary die size, slower performance, greater power consumption, and the like).

Accordingly, what is required is a system capable of efficiently optimizing large complex integrated circuit designs for power dissipation. What is required is a system capable of vigorously optimizing a complex integrated circuit design for power dissipation within the reasonable time and resource constraints of modern EDA design synthesis processes. The present invention provides a novel solution to these requirements.

SUMMARY OF THE INVENTION

The present invention provides a system capable of efficiently optimizing large complex integrated circuit designs for power dissipation. The present invention provides a method and system capable of vigorously optimizing a complex integrated circuit design for power dissipation within the reasonable time and resource constraints of modern EDA design synthesis processes.

In one embodiment, the present invention is implemented as a genetic algorithm (GA) based process to optimize integrated circuit designs for power dissipation. The genetic algorithm optimization process efficiently generates tight lower bounds of the peak power dissipation for a given integrated circuit design. In this approach, the power within a given integrated circuit design is viewed as a function in terms of a set of stimuli to primary inputs of the integrated circuit design. Maximization of the function, and hence, the power dissipation, is guided by the genetic algorithm. By repeatedly stimulating the integrated circuit design and measuring the corresponding response, the genetic algorithm process of the present invention efficiently explores the solution space to obtain a maximization of the function.

The genetic algorithm process is implemented within a computer-based EDA synthesis system. The EDA synthesis system executes the computer implemented steps of accessing a circuit netlist representing an integrated circuit design to be realized in physical form, defining a function that describes the power with respect to stimulation, maximizing the function by using a genetic algorithm to obtain a set of stimulation inputs which generate a maximum power dissipation, and optimizing power dissipation for the circuit netlist by optimizing those portions of the circuit netlist identified by the set of stimulation inputs.

By repeatedly stimulating the circuit and measuring the corresponding response, GA efficiently explores the solution space through mechanisms analogous to natural selection. These mechanisms include, for example, GA operations such as crossover, mutation, reproduction, and the like. Targeting large-scaled, high density designs in deep submicron technology, the EDA synthesis system of the present invention drives the GA "evolution" process of power optimization. For example, experiments with ISCAS-85 and ISCAS-89 benchmarks demonstrate the superiority of the optimization process of the present invention. Compared with the conventional prior art random simulation based techniques, the GA-based power dissipation optimization process can generate tighter lower bounds within shorter time. In so doing, the GA based optimization process of present invention is capable of vigorously optimizing a complex integrated circuit design for power dissipation within the reasonable time and resource constraints of modern computer implemented EDA design synthesis processes.

BRIEF DESCRIPTION OF THE DRAWINGS

The present invention is illustrated by way of example and not by way of limitation, in the figures of the accompanying drawings and in which like reference numerals refer to similar elements and in which:

FIG. 8 shows a first table of the performance of the genetic algorithm power optimization process of one embodiment of the present invention with respect to ICAS-85 combinational benchmarks.

FIG. 9 shows a second table of the performance of the genetic algorithm power optimization process of one embodiment of the present invention with respect to ICAS-89 sequential benchmarks.

DETAILED DESCRIPTION OF THE INVENTION

Reference will now be made in detail to the embodiments of the invention, a method and system for genetic algorithm based power optimization for integrated circuit, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to obscure aspects of the present invention unnecessarily.

Figure 1:
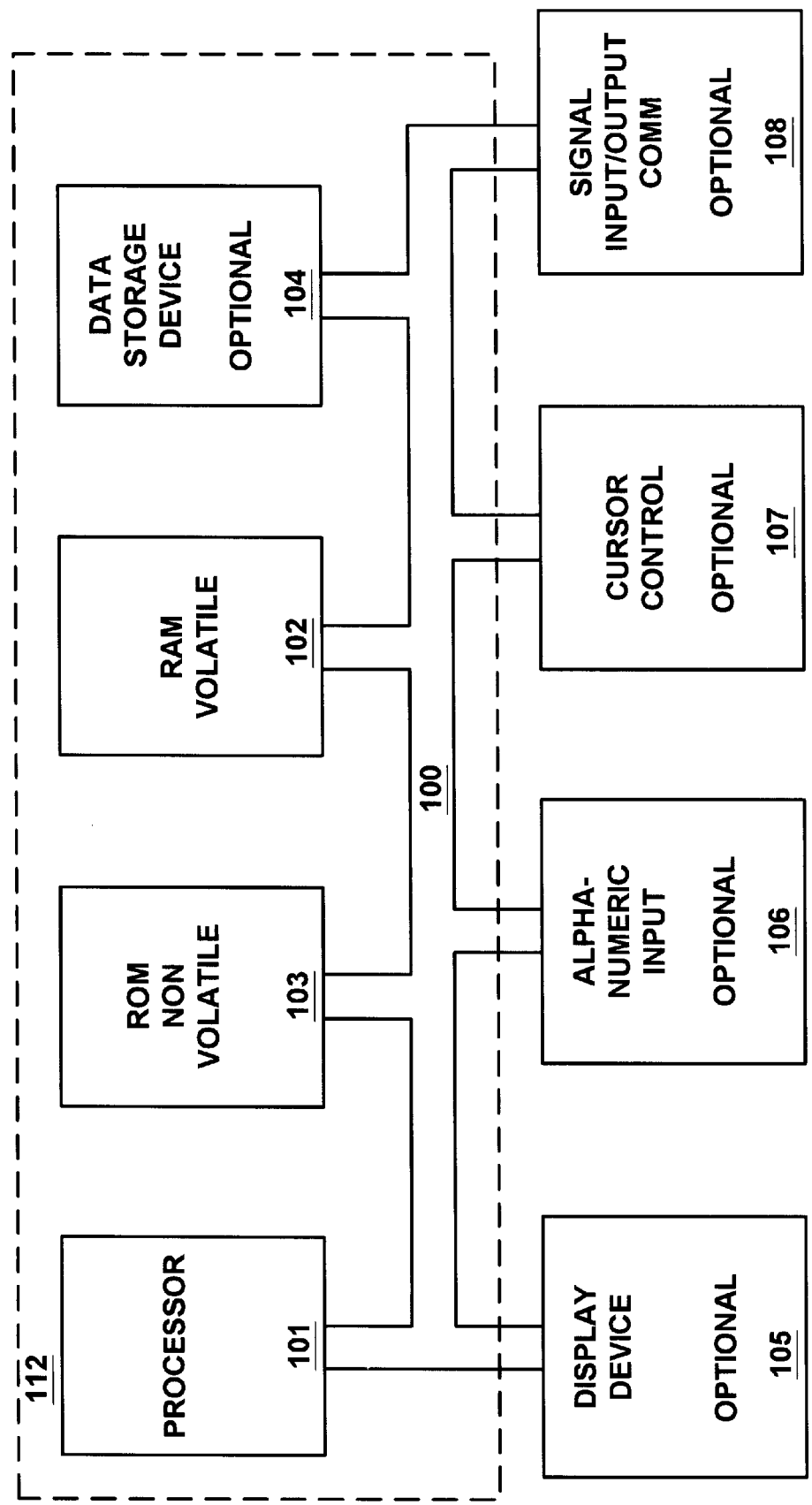
FIG. 1 shows a general computer system platform in accordance with one embodiment of the present invention.

The present invention provides a system capable of efficiently optimizing large complex integrated circuit designs for power dissipation. The present invention provides a method and system capable of vigorously optimizing a complex integrated circuit design for power dissipation within the reasonable time and resource constraints of modern EDA design synthesis processes. In one embodiment, the present invention is implemented as a genetic algorithm (GA) based process to optimize integrated circuit designs for power dissipation and is implemented within a computer-based EDA synthesis system. A general configuration of the computer system platform for the EDA system of the present invention is shown in FIG. 1 below.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "computing," "translating," "instantiating," "determining," "displaying," "recognizing," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices.

COMPUTER SYSTEM ENVIRONMENT

Referring to FIG. 1, a computer system 112 is illustrated. The genetic algorithm optimization process of the present invention is implemented within a computer-based EDA synthesis system such as computer system 112. Within the following discussions of the present invention, certain processes and steps are discussed that are realized, in one embodiment, as a series of instructions (e.g., software program) that reside within computer readable memory units of system 112 and executed by processors of system 112. When executed, the instructions cause computer system 112 to perform specific actions and exhibit specific behavior which is described in detail to follow.

Specific aspects of the present invention are operable within a programmed computer aided design (CAD) system, or similar element in an electronic design automation (EDA) system. A CAD system operable to implement the elements of the present invention is shown in FIG. 1. In general, the CAD system of the present invention includes an address/data bus 100 for communicating information, one or more central processor(s) 101 coupled with bus 100 for processing information and instructions, a computer readable volatile memory unit 102 (e.g., random access memory, static RAM, dynamic RAM, etc.) coupled with bus 100 for storing information and instructions for the central processor(s) 101, a computer readable non-volatile memory unit 103 (e.g., read only memory, programmable ROM, flash memory, EPROM, EEPROM, etc.) coupled with bus 100 for storing static information and instructions for processor(s) 101. System 112 can optionally include a mass storage computer readable data storage device 104, such as a magnetic or optical disk and disk drive coupled with bus 100 for storing information and instructions. Optionally, system 112 can also include a display device 105 coupled to bus 100 for displaying information to the computer user, an alphanumeric input device 106 including alphanumeric and function keys coupled to bus 100 for communicating information and command selections to central processor(s) 101, a cursor control device 107 coupled to bus for communicating user input information and command selections to the central processor(s) 101, and a signal input/output device 108 coupled to the bus 100 for communicating messages, command selections, data, etc. to and from processor(s) 101.

Program instructions executed by the CAD system can be stored in RAM 102, ROM 103, or in the storage device 104 and when executed in a group can be referred to as logic blocks or procedures. It is appreciated that data produced at the various logic synthesis stages of the present invention, including representations of the different levels of abstraction of the integrated circuit design, can also be stored in RAM 102, ROM 103 or the storage device 104 as shown in FIG. 1.

The display device 105 of FIG. 1 utilized with the computer system 112 of the present invention may be a liquid crystal device, cathode ray tube, or other display device suitable for creating graphic images and alphanumeric characters recognizable to the user. The cursor control device 107 allows the computer user to dynamically signal the two dimensional movement of a visible pointer on a display screen of the display device 105. Many implementations of the cursor control device are known in the art including a trackball, mouse, joystick or special keys on the alphanumeric input device 105 capable of signaling movement of a given direction or manner of displacement.

CIRCUIT OPTIMIZATION GENERALLY

The present invention provides a method and system for efficiently optimizing large complex integrated circuit designs with respect to power consumption and power dissipation. In so doing, the present invention overcomes the problems posed by the power optimization analysis of very large integrated circuit designs. Modern high-performance integrated circuits are growing larger and larger. When the designs of such circuits become very large, they place an inordinate burden on optimization and analysis tools which try to process them. In particular, the tools require increasingly large amounts of computer memory and CPU time to process the circuits in their entirety. One of the primary optimization constraints is power optimization.

Embodiments of the present invention perform power optimization (e.g., design optimization of power consumption and/or power dissipation characteristics) on large complex integrated circuits in part, by using a genetic algorithm (GA) based process to efficiently search the extremely large number of possible test inputs. In a typical implementation, the GA power optimization process functions as one part of an overall logic synthesis process.

Figure 2:
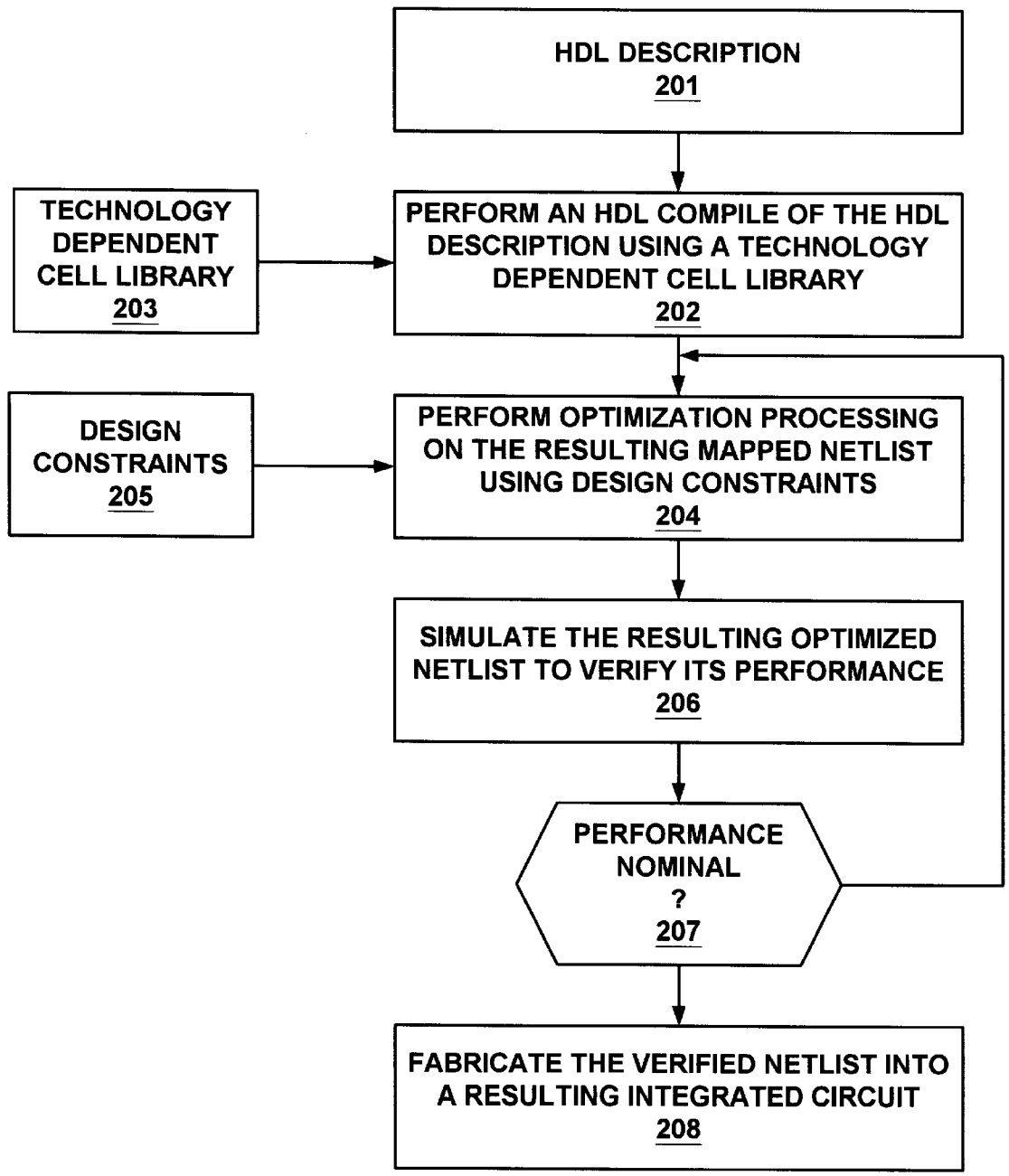
FIG. 2 shows a in flow chart diagram showing the overall steps of a logic synthesis and optimization process in accordance with one embodiment of the present invention.

FIG. 2 shows a flow chart diagram of showing the overall steps of a logic synthesis and optimization process 200 in accordance with the present invention. Process 200 is implemented in a CAD environment within a computer system platform, such as, for example, computer system 112 of FIG. 1. Process 200 begins in step 201, where an HDL description of the integrated circuit is received (e.g., from a design application). In step 202, the HDL description is compiled by a specialized HDL compiler tool. The compiler (also called an HDL compiler, RTL synthesizer, or architectural optimizer) inputs the HDL 201 description and compiles this description using logic and mapping procedures which interface with a technology dependent cell library 203 (e.g., from LSI, VLSI, TI or Xilinx technologies, etc.). The cell library 203 contains specific information regarding the cells of the specific technology selected such as the cell logic, number of gates, area consumption, power consumption, pin descriptions, etc., for each cell in the library 203. The compiling procedure of block 202 ultimately generates a gate level mapped netlist that is technology dependent and has cells specifically selected in accordance with a particular manufacturing technology (e.g., CMOS).

In step 204, the compiler then performs optimization processing on the resulting mapped netlist from step 202. The optimization processing is performed using a set of design constraints 205. The gate level netlist received from step 202 is processed in light of the design constraints 205. Design constraints 205 include the power consumption and power dissipation constraints for the design, along with other design constraints, such as, for example, device timing, silicon area, and other performance related limitations. The compiler then attempts to satisfy these constraints by altering the mapped netlist generated in step 202. Design constraints 205 can also include non-performance related constraints such as structural and routing constraints.

Referring still to step 204 of FIG. 2, constraints are used to guide the optimization and mapping of a design towards feasible realization in terms of power dissipation and power consumption, area, performance, costs, testability, and other physical limitations. The constraints provide the goals for the optimization and synthesis tools to achieve. Power consumption and performance constraints are the two most common constraints. For example, for behavioral synthesis, the area constraints are usually specified at the architectural level where a designer specifies the number of function units, registers, and busses to be used on the RTL structure, while timing constraints are specified as the expected clock frequency of each clock signal.

Technology libraries 203 and design constraints 205 typically contain all the information needed by the synthesis tool to make correct choices in building the structure of the integrated circuit. They contain descriptions of the behavior of a cell and information such as the area of the cell, the timing of the cell, the capacitance loading of the cell, the rise and fall delay values for the basic cells, etc. The objective of the optimization process is to generate the most efficient detailed layout of the integrated circuit possible, while satisfying the design constraints (e.g., power consumption) to the greatest degree possible.

Subsequently, in step 206, the resulting optimized netlist is simulated to verify its performance. In step 207, if the optimized netlist performs as desired, the resulting verified netlist proceeds to subsequent fabrication processing and is fabricated into a resulting integrate circuit, as shown in step 208. However, should performance of the optimized netlist prove substandard, additional optimization processing and simulation is performed until the netlist can be verified.

MAXIMUM POWER DESIGN CONSTRAINTS AND OPTIMIZATION

Maximum power in VLSI circuits has a great impact on power budgeting, packaging, as well as the circuit's reliability. To synthesize highly reliable integrated circuit systems, accurate estimates of maximum power consumption/dissipation must be obtained during the design optimization process (e.g., step 204 of FIG. 2).

Figure 3:
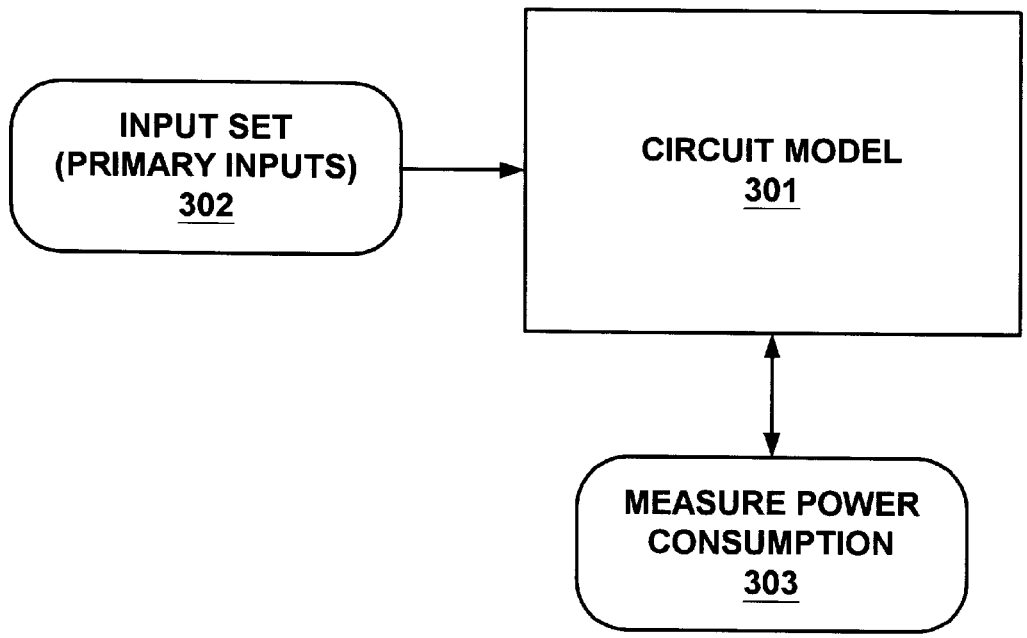
FIG. 3 shows a block diagram of genetic algorithm power optimization performed by one embodiment of the present invention.

FIG. 3 shows a diagram of power measurement by similation as performed, for example, in step 204 of FIG. 2. Power measurement is part of the power optimization process. FIG. 3 depicts a circuit model 301 (e.g., a mapped netlist as described above in the discussion of steps 202 and 204 of FIG. 2). The circuit model 301 is coupled to receive input set 302. Input set 302 comprises a set of test vector inputs used to stimulate the primary inputs of the circuit model 301. Input set 302 is used to change the state of circuit model 301 in accordance with a clock signal, and thereby allow the determination of the power consumption of the various nodes and elements comprising circuit model 301. The measurement of power consumption is accomplished by ascertaining the charged/discharged state of the various nodes of circuit model 301 as the states are changed in accordance with the clock signal and the input set 302. This is shown by measure power consumption 303.

The objective of power optimization is to obtain an input set 302 which induces maximum power consumption within circuit model 301 as measured by measure power consumption 303. Subsequently, the resulting input sets and the resulting power consumption measurements are used to alter the configuration of circuit model 301 to produce a more optimal mapped netlist configuration. Unfortunately, determining the input patterns (e.g., input set 302) to induce the maximum current (power) is essentially a combinatorial optimization problem. Even for integrated circuits with a small number of primary inputs, it is CPU time intensive to conduct exhaustive search of the entire input vector space in order to find those sets of primary inputs which induce maximum power consumption.

This problem as become even more insurmountable with the increasing complexity and size of modern high-density integrated circuits. High complexity circuit models (circuit model 301) often have many hundreds, or even thousands, of primary inputs. Accordingly, the only reasonably feasible way to discover those sets of primary inputs which induce maximum power consumption is to find good upper and lower "bounds" of the maximum power, and to make the gap between these two bounds as narrow as possible. Hence, for high-density digital integrated circuits, the problem of accurate estimation of maximum power consumption involves searching for those sets of binary input vectors (e.g., input set 302) that induce maximum power consumption in the circuit model. In a worst case, this problem has a complexity exponential to the number of primary inputs (PIs), which unfortunately, can number into the thousands. Consequently, as described above, for large high-density integrated circuit designs, the only feasible approach is to generate tight upper and lower bounds of the maximum power within a reasonable amount of CPU time so that the gap between the bounds is as narrow as possible.

To produce the most accurate estimates of power consumption, a circuit model needs to be simulated at the transistor level mapped netlist description. In estimating maximum power at the transistor level, the problem is even more complicated. In additional to the charging/discharging at the output of logic gates, other sources (e.g. leakage current, switching capacitance internal to logic gates, etc.) contributing to the power and analog behaviors also need to be considered. Accordingly, an exhaustive search of the input set space is virtually impossible.

The present invention provides a novel solution to the problem. In accordance with present invention, genetic algorithms are used to guide the optimization process during the search of the input set space for those input sets which induce maximum power consumption. The genetic algorithm based approach of the present invention provides for the efficient generation of tight lower bounds of maximum power for a given circuit model, within a reasonable amount of CPU time.

Genetic algorithms generally referred to those algorithms which adopt mechanisms analogous to "natural selection" as appearing in nature. The natural selection type mechanisms are used to maximize a given fitness (e.g., objective) function. In the case of power consumption optimization, the objective function characterizes the power consumption of the given circuit model and the genetic algorithms are used to maximize the objective function. To use genetic algorithm optimization techniques for maximum power estimation, the process of the present invention views power consumption of a given circuit as the fitness function (e.g., objective function), and each string, or input set, kept by the genetic algorithm as a specific combination of input stimuli and circuit state. Experiments have been performed with industry standard ISCAS-85 and ISCAS89 benchmark circuits. Results (shown in FIGS. 8 and 9 below) show that, the GA-based searching technique of the present invention is more efficient than, for example, the prior art random simulation techniques in terms of CPU time and quality of the estimates.

It should be noted that, the performance of the genetic algorithm evolution process is often dominated by the performance of the particular circuit simulator used. To obtain accurate estimates for large high-density integrated circuit designs, a highly efficient circuit simulator should be utilized to drive the evolution process. One such simulator is PowerMill, from Synopsis Inc. PowerMill is well suited for this purpose.

GENETIC ALGORITHMS GENERALLY

In general, genetic algorithms are general-purpose search algorithms based upon the principles of evolution as observed in nature. For example, genetic algorithms combine the techniques of selection, crossover, and mutation operators with the goal of finding the best solution to a problem. In typical implementations, genetic algorithms search for this optimal solution until a specified termination criterion is met. In the genetic algorithm terminology, the solution to a problem is referred to as a "chromosome." As an analogy of nature, a chromosome is comprised of a collection of "genes" which are simply the parameters to be optimized. A genetic algorithm creates an initial population (a collection of chromosomes), evaluates this population, then evolves the population through multiple generations (using the genetic operators selection, crossover, mutation, and the like) in the search for a good solution for the problem at hand.

Genetic algorithms are generally well known and can be applied to a wide variety of optimization problems, such as, for example, scheduling, computer games, stock market trading, medical, adaptive control, transportation, etc. For example, in a multidimensional optimization problem, the chromosomes can be used to encode the values for different parameters being optimized in the form of a character string (e.g., a binary string of one's and zeros). Genetic algorithm techniques are then used to maximize some function of the chromosomes. For example, a genetic model of computation can be implemented by having strings or arrays of bits/characters to represent the chromosomes. The data manipulation operations are then used to implement the genetic algorithm techniques of selection, crossover, mutation, and other operations.

Figure 4:
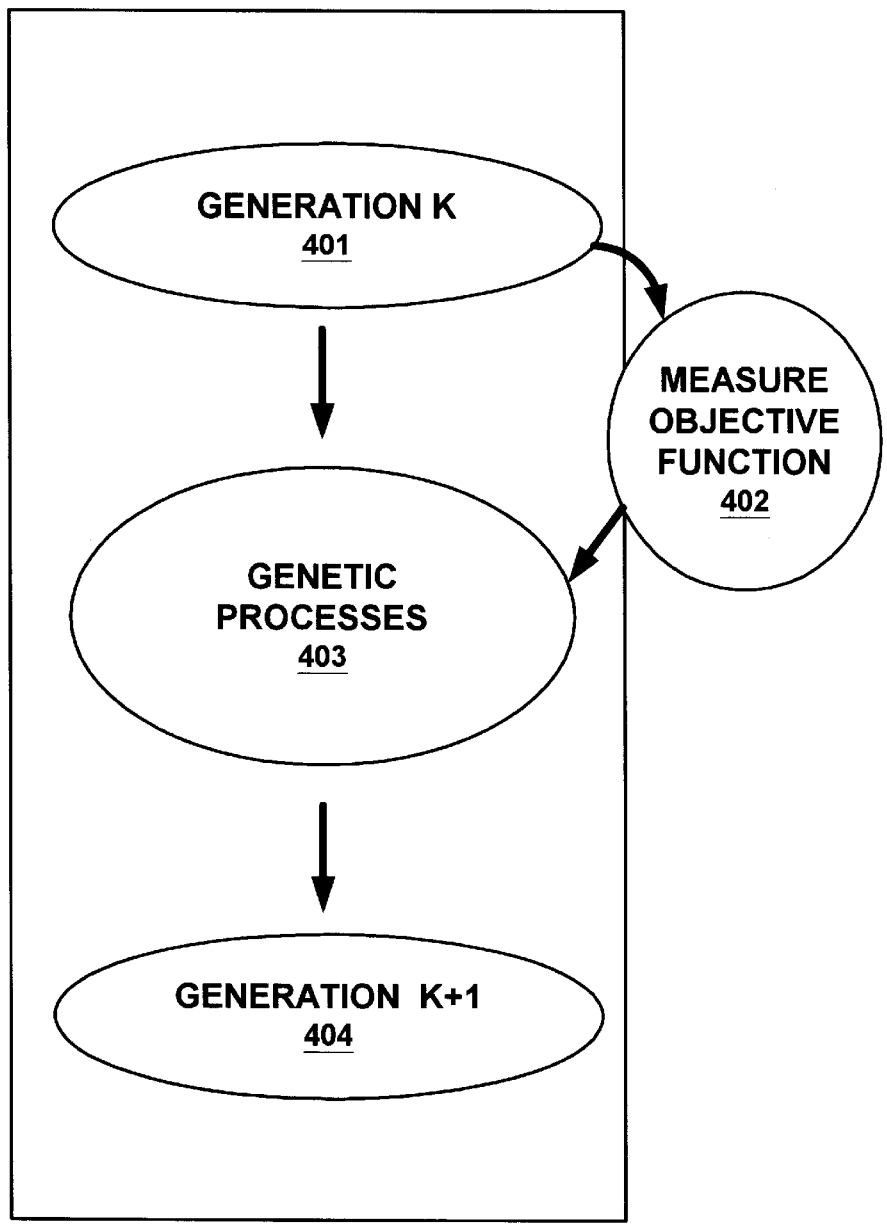
FIG. 4 shows a flow diagram of a genetic algorithm process in accordance with one embodiment of the present invention.

Referring now to FIG. 4, a diagram of a genetic algorithm process in accordance with one embodiment of the present invention is shown. In general, when a genetic algorithm is implemented, it is usually implemented in a manner that involves the following cycles: Evaluate the fitness of all individual solutions in a population. Create a new population by performing genetic algorithm operations (e.g., crossover, mutation, fitness proportionate reproduction, etc.). Discard the old population and iterate using the new population. One iteration of this loop is referred to as a generation. Typically, the first generation (commonly referred to as generation 0) of this process operates on a population of randomly generated individual solutions. From this first generation onward, the genetic operations, in concert with the fitness measure (e.g., the objective function described above) operate to improve the population. Hence, FIG. 4 shows the initial generation k 401, which is assessed using the objective function 402. Based upon the results of the assessment, genetic processes 403 are performed on the population of the initial generation k, resulting in a new generation k+1 404.

A pseudocode representation of genetic algorithm 400 is shown below:

Algorithm GA is:
// start with an initial time
t:=0;
// initialize a random population of individuals initpopulation P (t);
// evaluate fitness of all initial individuals of population using an objective function
evaluate P (t);
// test for termination criterion (time, fitness, etc.) while not done do
// increase the time counter
t:=t+1;
// select a sub-population for offspring production
P':=selectparents P (t);
// recombine the "genes" of selected parents
recombine P' (t);
// perturb the mated population stochastically
mutate P' (t);
// evaluate it's new fitness
evaluate P' (t);
// select the survivors from actual fitness
P:=survive P,P' (t);
od
end GA.

Thus, as used in the present invention, the set of inputs (e.g., input set 302 from FIG. 3) are labeled, for example, as "x" and a number starting from 1, the result being an input vector x, i.e., $(x_1, x_2, x_3, \ldots X_n)$, where n is a number of inputs in the string. An objective function is then defined that characterizes the power consumption of the given circuit model as a function of the input vector x, e.g., f(x). As described above, the goal of the genetic algorithm is to find those input vectors which induce maximum power consumption.

THE GA OPTIMIZATION PROCESS

As described above, embodiments of the present invention perform power optimization on large complex integrated circuits by using a genetic algorithm (GA) based process to efficiently search the extremely large number of possible sets of inputs.

Given a combinational circuit, the curve of power within a clock cycle is determined by 1) the binary input vector applied to the combinational circuit's primary inputs, and 2) the status of the combinational circuit before the vector is applied. As used herein, the status of a circuit is defined as a combination of the charged/discharged situation of nodes within the circuit.

For a given circuit, V is used to denote the set of inputs containing all the possible input vectors, and (p is used to represent the set containing all the possible statuses of the circuit. Thus, the solution space for GA can be encoded as $\{(v, \phi) | v \in V, \phi \in \Phi\}$. The drawbacks of this scheme are:

1. During the evolution process, GA needs to randomly generate members of Φ. Considering the spatial correlation of signals in the circuit, this can be a time-consuming process.

2. Set Φ is not closed under the operation of genetic processes (e.g. mutation, crossover).

The validity of members of Φ can be easily destroyed during the evolution process. Hence, instead of controlling the status of the circuit directly, GA processing in accordance with the present invention unrolls the circuit into two consecutive clock cycles and encodes the solution space of GA as $\{(v_1, v_2) | v_1 \in V, v_2 \in V\}$. Here $v_1$ and $v_2$ denote the input vectors applied in clock cycle I and II, respectively. Vector $v_1$ is used to set up the status of the circuit at the beginning of clock cycle II, and power will be monitored in clock cycle II. Note that V equals $\{0, 1\}^n$ for a combinational circuit containing n primary inputs (PIs), and is closed under the genetic processes.

In this manner, each fitness measure (i.e., power) is induced by two consecutive input vectors. In accordance with the present embodiment, the first input vector ($v_1$) stimulates the PIs and propagates the effect toward primary outputs, to set up the state of nodes (charged or discharged) internal to the circuit. In clock cycle II, the second input vector ($v_2$) causes charging or discharging of the switching capacitance, and the power is measured as a summation of dynamic power (caused by the switching current and short-circuit current) and static power (caused by the leakage current).

For example, in the present embodiment, at the end of clock cycle I, although nodes at the output of the logic gates are shorted to either Vdd or GND, nodes internal to logic gates might be isolated from both ends and keep their original value. This uncertainty would influence not only the power, but also the propagation delay associated with this logic gate in clock cycle II. Generally speaking, the capacitance internal to a logic gate is a relatively small number compared with the capacitive load at the gate's output. Hence, in the present embodiment, the impact of this uncertainty is neglected by the GA processing while generating the fitness measures.

Figure 5:
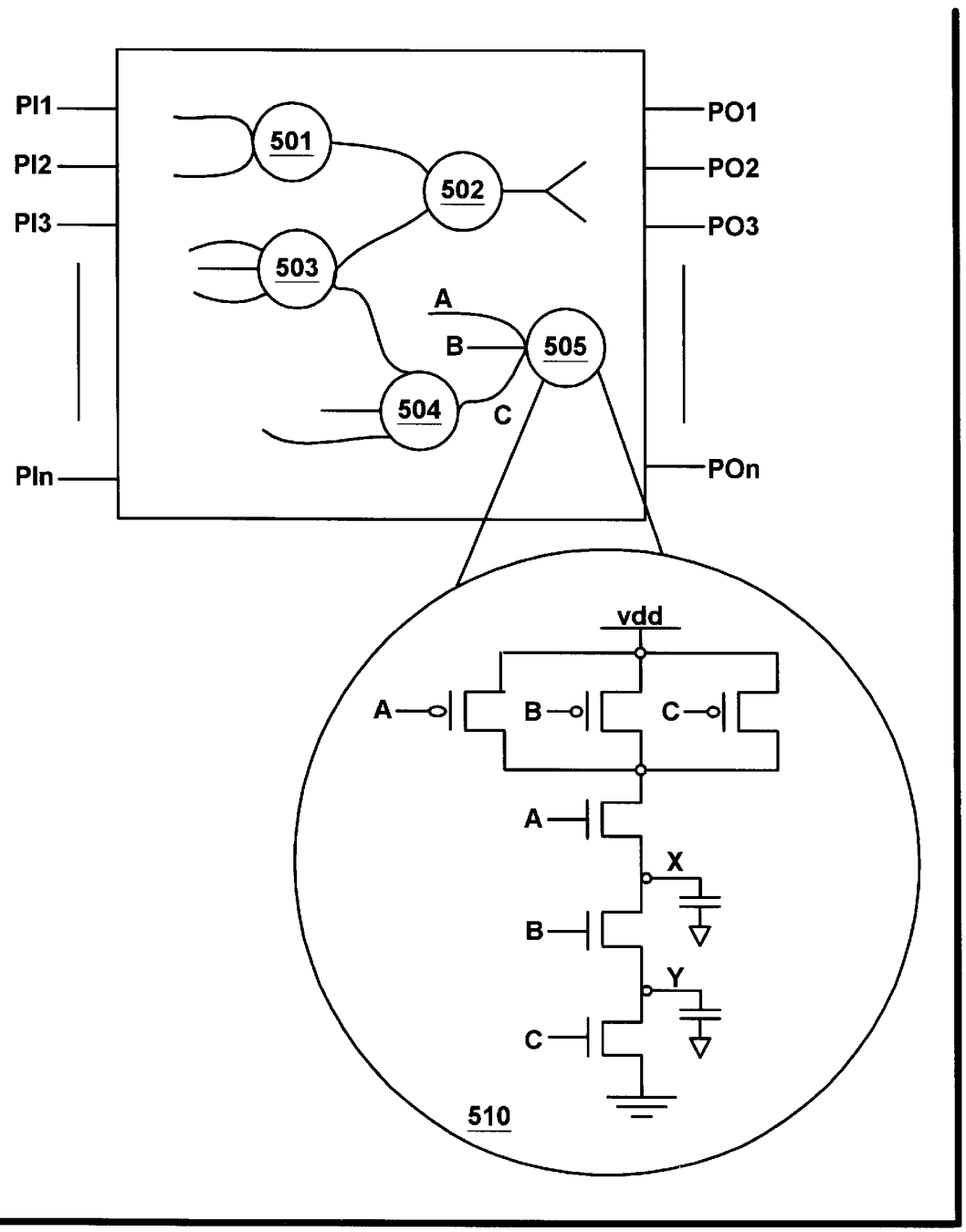
FIG. 5 shows a diagram of a portion of an integrated circuit model with primary inputs and primary outputs as used by one embodiment of the present invention.

Referring now to FIG. 5, a diagram 500 of a circuit portion of integrated circuit model 301 is shown. Diagram 500 shows primary inputs PI1, PI2, PI3, through PIn and primary outputs PO1, PO2, PO3, through POn. Diagram 500 also shows a series of nodes internal to the circuit portion, nodes 501–505. Legend 510 shows the contents of nodes 505 in greater detail. As depicted in legend 510, node 505 includes switching elements, labeled as A, B, and C, and capacitive elements, labeled as X and Y.

As described above, each fitness measure is induced by two consecutive input vectors, the first input vector stimulating the PIs and propagates the effect toward the POs to set up the state of nodes 501–505 (charged or discharged), while the second input vector ($v_2$) causes charging or discharging of the switching elements and switching capacitance A, B, C, X and Y. As described above, the power is measured as a summation of dynamic power (caused by the switching current and short-circuit current) and static power (caused by the leakage current).

For example, in the present embodiment, at the end of clock cycle I, although nodes at the output of logic gates are shorted to either Vdd or GND, nodes internal to logic gates might be isolated from both ends and keep their original value. This uncertainty would influence not only the power, but also the propagation delay associated with this logic gate in clock cycle II. Generally speaking, the capacitance internal to a logic gate is a relatively small number compared with the capacitive load at the gate's output. Hence, the impact of this uncertainty is ignored by the GA processing of the present invention while generating the fitness measures (e.g., assessing the objective function).

Figure 6:
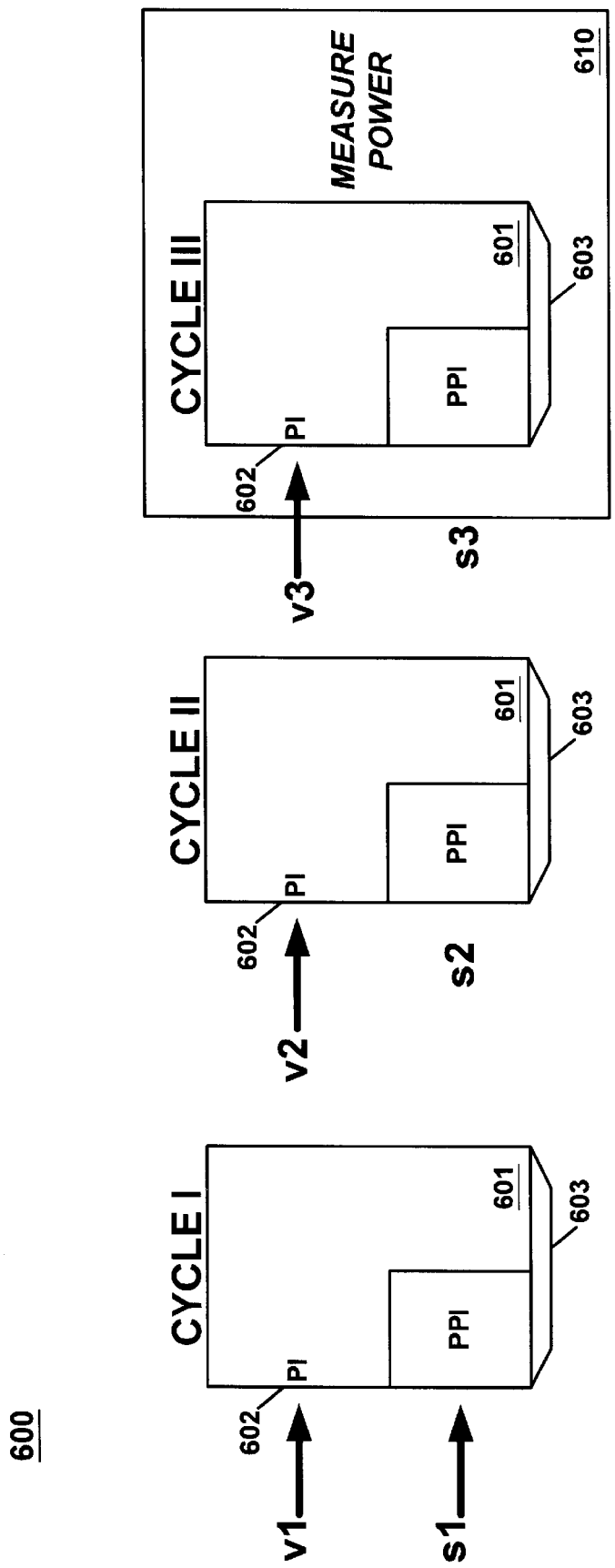
FIG. 6 shows a diagram showing the multiple cycles used to measure power consumption as implemented in one embodiment of the present invention for processing sequential circuit blocks.

Referring now to FIG. 6, a diagram 600 showing the multiple clock cycles used to measure power consumption as implemented in one embodiment the present invention is shown. Diagram 600 shows the power consumption measurements being performed on a sequential circuit block 601. Circuit block 601 is shown in three phases, cycle I, cycle II, and cycle III. In each phase, circuit block 601 receives an input vector at a primary input 602, v1, v2, and v3.

To facilitate the discussions for sequential circuits (e.g., circuit block 601), the following notations and definitions are introduced:

1. PPIs: Pseudo-Primary Inputs, which are defined as the outputs of memory elements (e.g., FFs, latches) in a circuit.

2. P: denotes the set containing all the possible combinations of the values at PPIs in the circuit (e.g., the reachable states). A sequential circuit (e.g., circuit block 601) may contain multiple stages of FFs (or latches). At each stage, the structure of the combinational part driving the FFs restricts possible combinations of the values stored in the FFs. For example, for a stage with m FFs, the set containing all the possible combinations of values stored in the FFs will be a subset of $\{0, 1\}^m$.

3. V: denotes the set containing all the possible input vectors applied to the PIs. For a circuit containing n PIs, V is equal to $\{0, 1\}^n$.

4. φ: denotes the set containing all the possible statuses of the circuit.

Referring still to FIG. 6, as described above in the discussion of power consumption measurements in combinational circuits, the sequential circuit block 601 is unrolled into two consecutive clock cycles (cycles II and III) after an initial state (cycle I), and the power consumption is measured in the second of the two consecutive clock cycles (cycle III) as shown by the outlined area 610 in FIG. 6. Accordingly, the GA solution space is encoded as $\{(v_2, p_2, v_3)|v_3, v_2 \in V, p_2 \in P\}$. Here $v_i$ and $p_i$ denote the stimuli to PIs 602 and PPIs 603 at clock cycle i, respectively. In this way, the status of the circuit at the very beginning of clock cycle III can be determined by $v_2$ and $p_2$. However, the drawbacks of this scheme are:

1. Directly generating members of P is required during the evolution process. This can be a task without further information of the circuit (e.g. statetable).

2. Set P is not closed under the operation of genetic processes.

To resolve this, GA processing unrolls a sequential circuit into three consecutive clock cycles (I, II, and III) and monitors the power in clock cycle III. We encode the solution space for GA as $\{(v_1, q_1, v_2, v_3)|v_1, v_2, v_3, \in V, q_1, \in \{0, 1\}^m\}$.

Here, m denotes the number of memory elements in the circuit, and $q_i$ represents the binary vector applied to PPIs 603 at clock cycle i. Note that both sets $\{0,1\}^m$ and V are closed under the genetic algorithm processes. In this vector-triplet approach (e.g., $v_1, v_2, v_3$), the first vector (containing $v_1$ and $q_1$) stimulates both PI 602 and PPIs 603 and drives the circuit block 601 into a reachable state (∈P) at the beginning of clock cycle II. In clock cycle II, the state, together with the second input vector ($v_2$), determine the status of the circuit block 601 at the beginning of clock cycle III. The power is measured in clock cycle III, as shown by outlined area 610. This is depicted in FIG. 6 as $s_1$ being externally driven in the same manner as $v_1$ in cycle I, and $s_2$–$s_3$ being determined by internal memory elements in cycles II and III.

It should be noted that the PPIs 603 are left floated in clock cycles II and III. Their values will be determined by the content of memory elements within circuit block 601 at the end of clock cycle I and II, respectively.

It should also be noted that the default configuration of the objective function is to maximize the power consumption of the entire circuit (e.g., circuit block 601) as a whole. However, in accordance with present invention, the objective function can be customized to maximize power consumption at a specific subportion or point within the circuit. In such an embodiment, the objective function can be built from arbitrary functions of circuit parameters. Such parameters include, for example, branch current at a specific net, voltage at a specific node or group of nodes, voltage drop at a specific net within the circuit, and the like. In this manner, the process of the present invention can be used to maximize (or minimize) any of a number of characteristics of circuit block 601. Such characteristics include current, thermal load, or any other similar characteristic that has physical meaning and which can be quantified using an objective function.

Figure 7A:
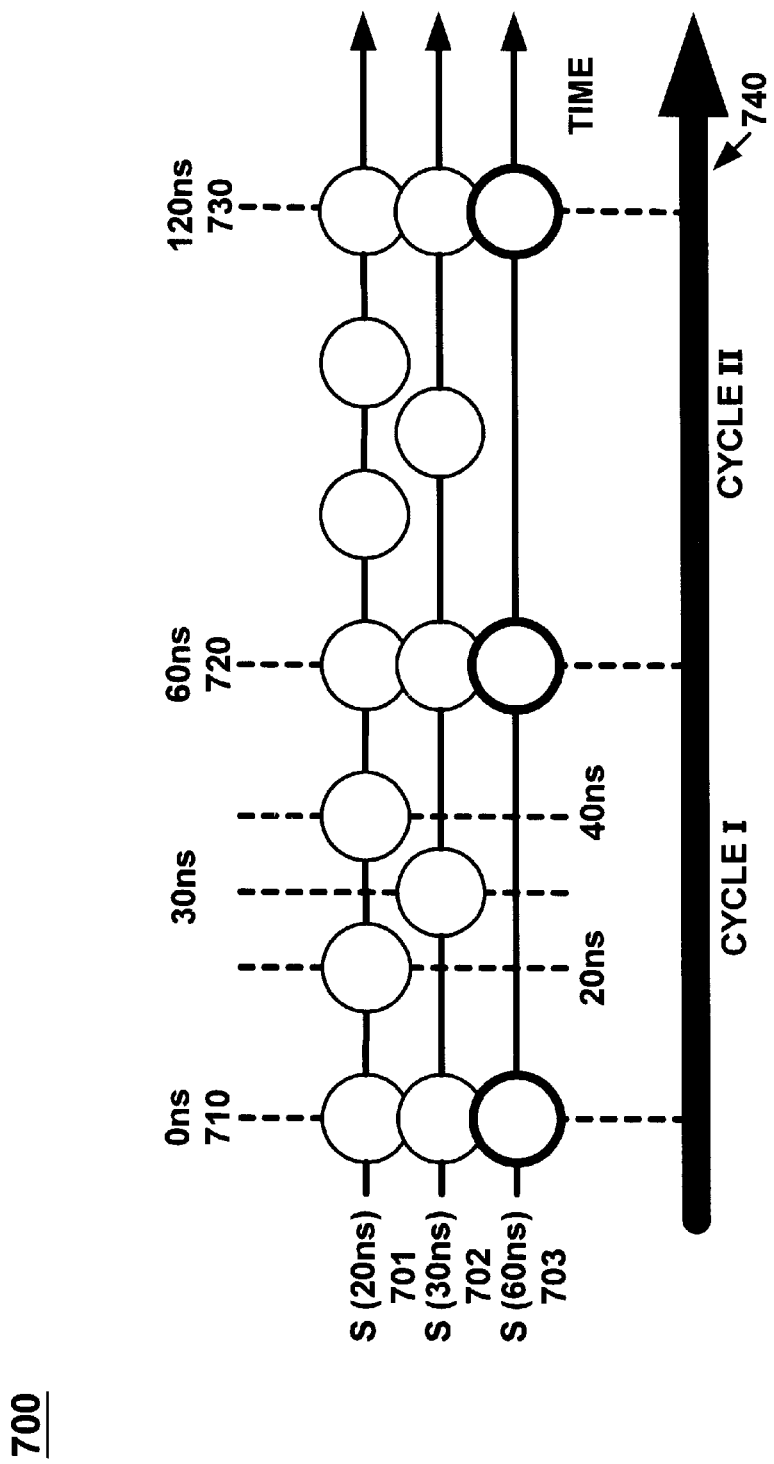
FIG. 7A shows a diagram depicting the operation of an embodiment of the present invention with combinational circuit blocks having three different clock signals with three different clock frequencies.
Figure 7B:
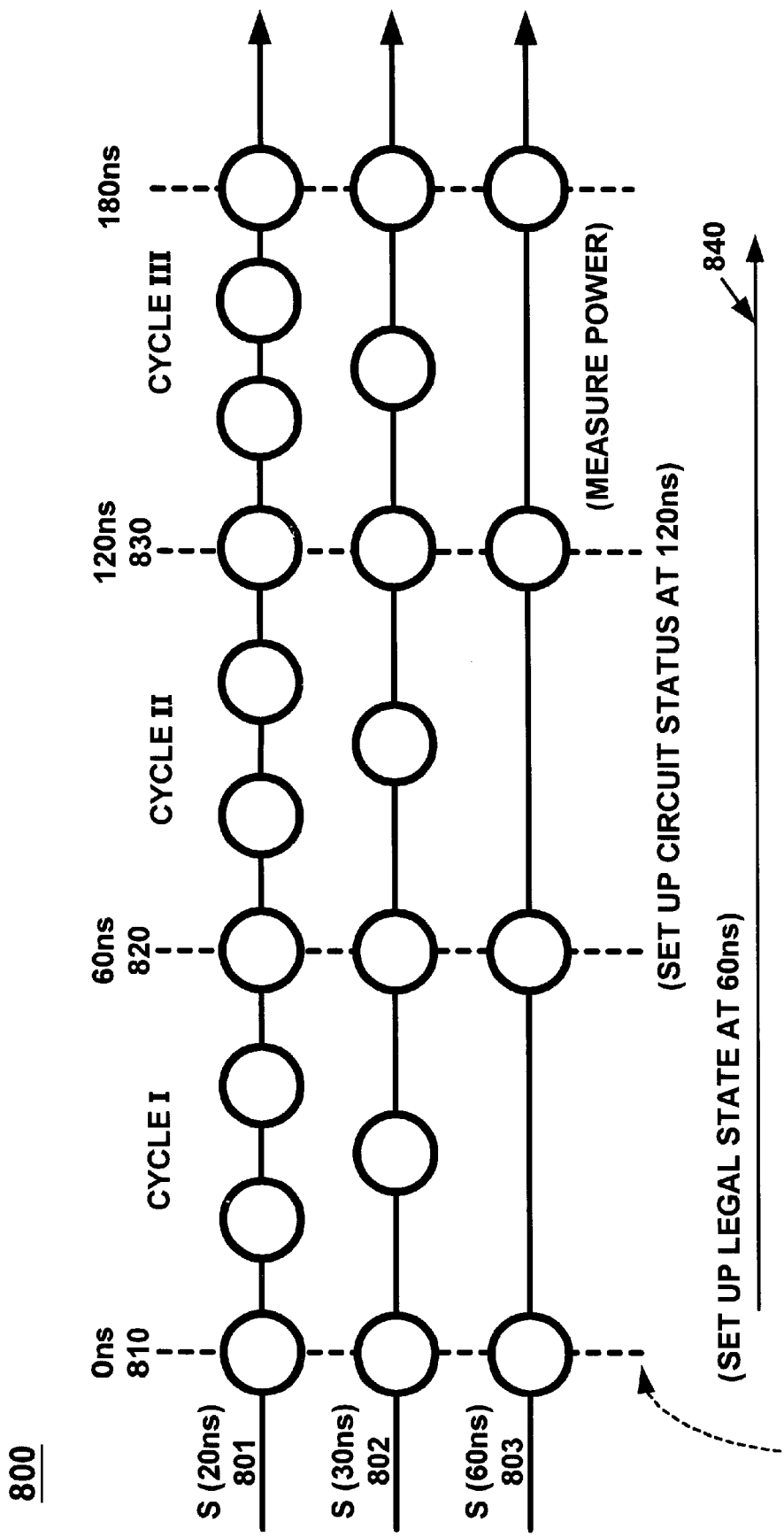
FIG. 7B shows a diagram depicting the operation of an embodiment of the present invention with sequential circuit blocks having three different clock signals with three different clock frequencies.

Referring now to FIG. 7A and FIG. 7B, a diagrams showing the operation of an embodiment of the present invention that functions with a combinational circuit block (FIG. 7A) and a sequential circuit block (FIG. 7B), each having three different clock frequencies, are shown. As depicted in FIG. 7A, diagram 700 shows signals 701–703 and depicted as horizontal lines proceeding from the left side of diagram 700 towards the right side. Signals 701–703 have periods of 20, 30, and 60 ns respectively. A horizontal axis 740 depicts increasing time, proceeding from left to right. Vertical lines 710, 720, and 730 depict time instances of 0 ns, 60 ns, and 120 ns as shown. Each of a plurality of circles occurring on signals 701–703 represent those times at which the internal logic of the circuit block (e.g., circuit block 601) is "stimulated" by the respective signals 701–703. Similarly, in FIG. 7B, diagram 800 shows signals 801–803 and depicted as horizontal lines proceeding from left to right, having periods of 20, 30, and 60 ns, with a horizontal axis 840 depicting increasing time and vertical lines (e.g., 810, 820, and 830) depicting the respective clock periods. As with diagram 700, in diagram 800, each of the circles occurring on signals 801–803 represent those times at which the internal logic of the circuit block is stimulated.

Performing optimization on a circuit having multiple clocks of different frequencies is a particularly difficult problem. In the present embodiment, this problem solved by defining the cycles in terms of the LCM (least common multiple) of the different clock signals. For a combinational circuit (diagram 700), two cycles are used. For a sequential circuit (diagram 800), three cycles are used.

Referring to diagram 700 of FIG. 7A, the multi-clock combinational circuit block is unrolled into two consecutive clock cycles (cycles I and II), with the power consumption being measured in cycle II. However, instead of a single signal stimulus being applied, a number of signal stimuli are applied in accordance with the periods of the respective signals 701–703 in order to determine the status of the circuit block at the beginning of the respective cycles.

Signals 701–703 are the applied to the PIs of the circuit partitions driven by the different clocks. Signal 701 is applied every 20 ns. Signals 702–703 are applied every 30 ns and 60 ns respectively. Different portions of the circuit are driven by the different clocks. To determine the status of the circuit at the beginning of each cycle, the duration of each cycle is equal to the LCM of the three clock signals, in this case, the 60 ns period of signal 703. Stimulus is applied to the circuit, using the signals 701–703, until the LCM occurs (every 60 ns), marking the end of a cycle. Thus, the signals applied in cycle I (e.g., including the first input vector) are applied in order to set up a legal status at the beginning of the next successive cycle. For combinational circuits, two cycles are needed, the first cycle required to set up the status of the circuit block for the measurements in the second cycle, as shown in diagram 700.

With sequential circuits, three cycles are needed. Referring to diagram 800 of FIG. 7B, the first cycle is used to set up the state of the circuit block, with stimulation inputs being applied to the PPIs to set up valid internal states. The signals applied in cycle II are applied to set up the status of the internal nodes of the circuit at the beginning of cycle III, with the PPIs being internally driven as opposed to externally driven via stimulation inputs. The status of the sequential circuit at the beginning of cycle III, together with the signals applied during cycle III, will decide the measurement of the power consumption in cycle III. The signals applied during cycle III stimulate the PIs and the internal storage elements of the sequential circuit block stimulate the PPIs, and the resulting effect propagates toward the POs, setting up the status of the internal nodes of the circuit, causing charging or discharging of the switching elements and switching as described above. The power is measured during cycle III as a summation of dynamic power (caused by the switching current and short-circuit current) and static power (caused by the leakage current). PPI inputs are applied to the circuit at the beginning of cycle I (e.g., shown in FIG. 6 as s1). From that point onward, nodes internal to the circuit generate the PPI.

It should be noted that the terms "circuit state" and "circuit status" as referred to herein are not identical. Circuit status refers to the status (e.g., charged, discharged, etc.) of the various nodes of either combinational or sequential circuits. Circuit state is defined only for sequential circuits, and refers to the status of the nodes at the outputs of the storage elements (e.g., buffers, flip-flops, registers, etc.). As described above, GA processing uses a three cycle approach for sequential circuits having multiple clocks. First, power is measured in cycle III, and is determined by the status of the sequential circuit at the beginning of cycle III and the stimuli applied during cycle III. Second, GA processing assumes capacitance internal to logic gates of the sequential circuit is relatively small compared to the gates' capacitive load. Hence, status of the sequential circuit at the beginning of cycle III is determined by the state of the circuit at the beginning of cycle II (determined by stimuli applied in cycle I) and stimuli applied in cycle II.

It should be noted that the genetic algorithm processing of the present embodiment can be halted at some point midway through the optimization process (e.g., halted after some amount of elapsed time wherein the amount of time is determined dynamically). At this point the user is free to assess the quality of the solutions. The user can then accept the solutions or continue processing after having adjusted one or more parameters of the circuit block. In this manner the user is not limited by the initial conditions of the genetic algorithm process (e.g. let the process run for a predetermined number of generations prior to examining the results).

In addition, it should be noted that once the set inputs is identified that induces maximum power dissipation, circuit status information is maintained to allow the user to determine how to make the best use of this information. For example, embodiments of the GA processing tool are adapted to maintain the status of the circuit block as the power measurements are taken. This aspect allows the user to examine the netlist of the circuit block in light of the power consumption information gained from the GA processing. The correlation of the power consumption information and the netlist allows the user to fine-tune and/or alter the configuration of the netlist in accordance with power consumption measurements taken, for example, at specific internal nodes of the netlist.

EXPERIMENTAL RESULTS

Referring now to FIG. 8 and FIG. 9, tables 1 and 2 are shown respectively, which depict the experimental results for well known industry standard benchmark tests, ISCAS-85 and ISCAS-89. In each table, the comparison of performance is made between the GA-based power optimization technique of the present invention (GA processing) and the prior art random simulation technique. In the prior art random simulation technique, stimuli to PIs and PPIs are modeled as stochastic processes each associated with a signal probability "p" (the probability of taking the logic value of ONE) and activity "a" (average number of transitions per unit time). In the experiments, both p and a are set as 0.5. Also, PowerMill (described above) is used as the circuit simulator for both GA processing and the prior art random simulation. The objective function is to maximize is the average power in a clock cycle. In Table 1 (FIG. 8), column 2 and 3 show power estimates (unit: watts) and CPU time for genetic algorithm power optimization with setting the population size as 20 and 30, respectively. Column 4 and 5 lists the results of random simulation with the same number of vector pairs used by genetic algorithm power optimization in column 2 and 3. Column 6 shows the performance of random simulation with 10,000 vector pairs. The ratio of the power numbers in Columns 2 and 4 is calculated in Column 7.

Results for ISCAS-89 sequential circuit are shown in Table II (FIG. 9). Column 3 shows the results for GA processing using the vector-triplet approach described above in the discussion of FIG. 6. In generating the results in column 4, GA processing treats the sequential circuits as combinational circuits such that only the PIs are stimulated during the GA processing evolution process. In Table II, the population size for GA processing is set as 20. Column 5 shows results for random simulation with the same number of vector triplets used by GA processing in Column 3. Results in Column 6 are generated by random simulation with 10,000 vector triplets. The ratio of the power numbers in Columns 3 and 4 (Columns 3 and 5) is computed in Column 7 (8).

Thus, judging from Table 1 and 2, the genetic algorithm power optimization technique of the present invention is superior to the prior art random simulation in terms of quality of the estimates and CPU time. For example, for benchmark C7552 in Table 1, GA processing (p-size=20) improves the maximum power generated from random simulation by 31% in 48% CPU time. For benchmark s38584 in Table II, GA processing improves the maximum power generated from random simulation by 2% in 33% CPU time. Hence, as compared with prior art random simulation, GA processing can generate better estimates within shorter CPU time.

Thus, the present invention provides a system capable of efficiently optimizing large complex integrated circuit designs for power dissipation. The present invention provides a method and system capable of vigorously optimizing a complex integrated circuit design for power dissipation within the reasonable time and resource constraints of modern EDA design synthesis processes.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a computer implemented synthesis system, a method of optimizing power dissipation for a design of an integrated circuit device by applying a genetic algorithm, comprising the computer implemented steps of:

a) accessing a circuit netlist, the circuit netlist representing an integrated circuit design to be realized in physical form;

b) building an objective function from functions of circuit parameters that describes the power dissipation for the integrated circuit design with respect to stimulation inputs for the integrated circuit design;

c) applying a first primary input vector to a set of primary inputs, and applying a pseudo-primary input vector to a set of pseudo-primary inputs, at a beginning of a first clock cycle;

d) applying a second primary input vector to the set of primary inputs at a beginning of a second clock cycle;

e) applying a third primary input vector to the set of primary inputs at a beginning of a third clock cycle;

f) measuring power consumption in said third clock cycle;

g) maximizing the function by repeating steps b) through f); and h) optimizing power dissipation for the circuit netlist by optimizing at least one portion of the circuit netlist identified by the set of stimulation inputs.

2. The method of claim 1, wherein one of said circuit parameters is a branch current at a specific net.

3. The method of claim 1, wherein one of said circuit parameters is a voltage at one or more nodes.

4. The method of claim 1, wherein one of said circuit parameters is a voltage drop at a specific net within the circuit design.

5. The method of claim 1, further comprising applying an additional input vector to the set of primary inputs during said first clock cycle.

6. The method of claim 1, wherein said power dissipation comprises dynamic power and static power.

7. A computer implemented synthesis system for performing power optimization for a design of an integrated circuit device, the system having a processor and a memory coupled via a bus, the memory containing computer readable instructions which when executed by the processor cause the system to implement a method comprising:

a) accessing a circuit netlist, the circuit netlist representing an integrated circuit design to be realized in physical form;

b) building an objective function from functions of circuit parameters that describes the power dissipation for the integrated circuit design with respect to stimulation inputs for the integrated circuit design;

c) applying a first primary input vector to a set of primary inputs, and applying a pseudo-primary input vector to a set of pseudo-primary inputs, at a beginning of a first clock cycle;

d) applying a second primary input vector to the set of primary inputs at a beginning of a second clock cycle;

e) applying a third primary input vector to the set of primary inputs at a beginning of a third clock cycle;

f) measuring power consumption in said third clock cycle;

g) maximizing the objective function by repeating steps b) through f); and h) optimizing power dissipation for the circuit netlist by optimizing at least one portion of the circuit netlist identified by the set of stimulation inputs.

8. The method of claim 7, wherein one of said circuit parameters is a branch current at a specific net.

9. The method of claim 7, wherein one of said circuit parameters is a voltage at one or more nodes.

10. The method of claim 7, wherein one of said circuit parameters is a voltage drop at a specific net within the circuit design.

11. The method of claim 7, further comprising applying an additional input vector to the set of primary inputs during said first clock cycle.

12. The method of claim 7, wherein said power dissipation comprises dynamic power and static power.

* * * * *